July 27, 1937.  E. E. HEWITT  2,088,170
MAGNETIC BRAKE CONTROL
Filed Oct. 24, 1935
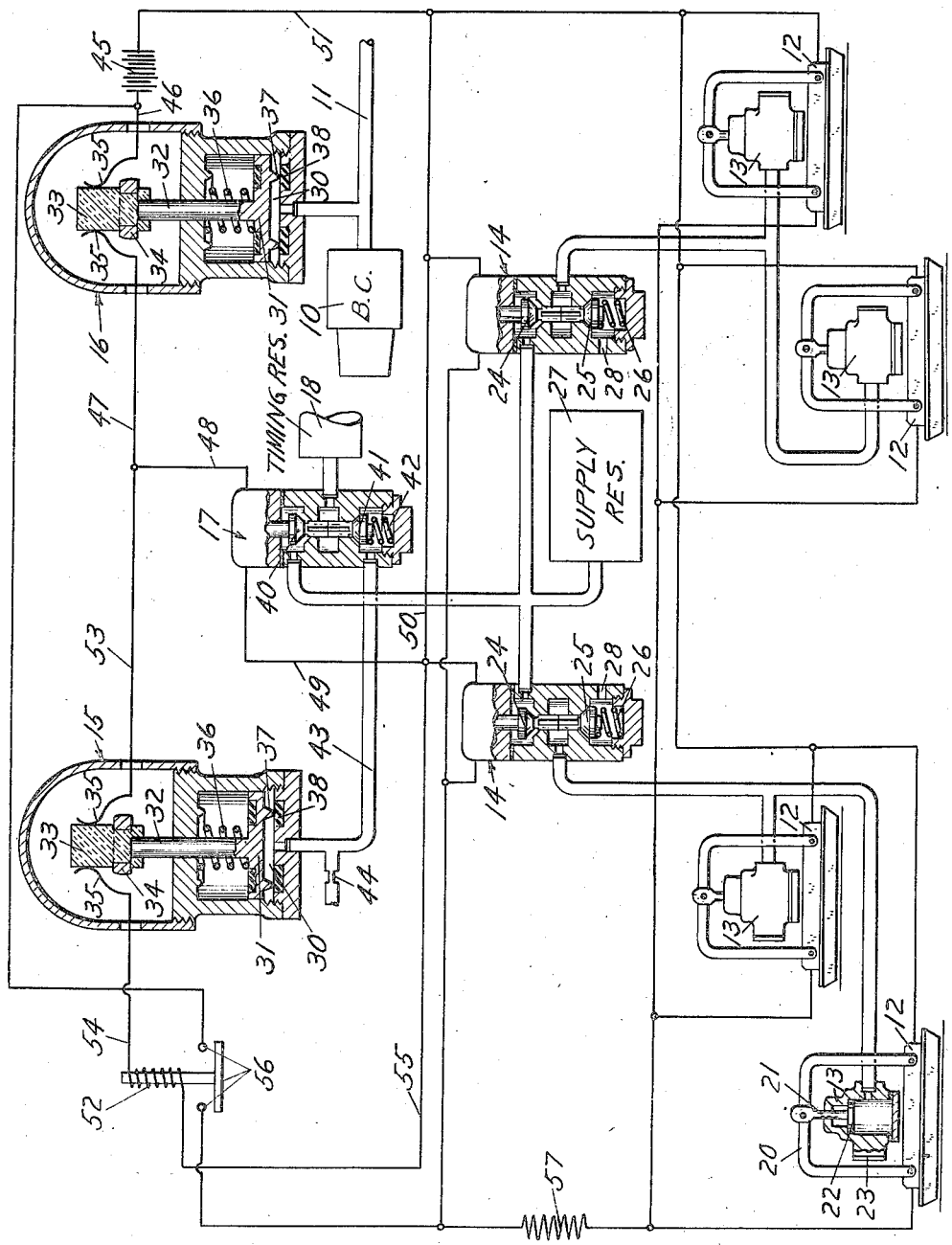
INVENTOR
ELLIS E. HEWITT
BY Wm. M. Cady
ATTORNEY Patented July 27, 1937

2,088,170

UNITED STATES PATENT OFFICE 2,088,170

MAGNETIC BRAKE CONTROL

Ellis E. Hewitt, Edgewood, Pa., assignor to The Westinghouse Air Brake Company, Wilmerding, Pa., a corporation of Pennsylvania Application October 24, 1935, Serial No. 46,463

5 Claims. (Cl. 303—3)

This invention relates to magnetic brake control, and more particularly to the control of magnetic brakes employed on railway trains and traction vehicles.

In certain types of brake equipments for railway trains and traction vehicles it has been found desirable to employ a magnetic track brake in addition to the usual fluid pressure brake. The magnetic track brake is applied by lowering the brake devices into engagement with the rail and energizing the magnetizing windings associated with these devices to produce a magnetic attraction between the associated shoes and rails.

If the energizing windings are maintained energized for any appreciable length of time after the train or vehicle has been brought to a stop, the heating produced may be so severe as to injure the insulation of the windings and thus render the magnetic brake inoperable. It is therefore desirable that the energizing windings be deenergized when the train or vehicle has been brought to a stop.

Various means have heretofore been proposed for accomplishing the deenergization of the track brake windings as the train or vehicle comes to a stop. In the present invention I contemplate an improved means for accomplishing this function. According to my invention I provide a brake equipment in which the track brake is not applied until fluid under pressure has been supplied to the brake cylinder of an associated fluid pressure brake portion of the equipment. In this manner an application of the track brake is effected during either a service or an emergency application of the fluid pressure brakes, and without regard to the degree of application so long as it is above a low predetermined value.

At any time fluid under pressure is released from the brake cylinder below the said predetermined value the track brake will be cut out of action, so that both the fluid pressure brake and the track brake are thus simultaneously released.

When the fluid pressure brake is applied, however, a switch device and an associated timing mechanism function to apply the track brake for a predetermined interval of time, which interval is preferably selected as one which is of sufficient duration to bring the train or vehicle to a stop under ordinary conditions, and one in which undue heating of the track brake windings will not result.

A principal object of the present invention is to provide a novel arrangement of parts for carrying out the operation just referred to, which arrangement of parts may be readily adapted to trains and vehicles having already installed thereon a conventional type of fluid pressure brake.

A further object of the invention is to provide a novel magnetic brake control which employs only devices which are known to be thoroughly reliable in operation.

Other objects and advantages of the invention will be more fully understood from the following description, which is taken in connection with the single figure of the attached drawing, wherein there is shown an embodiment of the invention adapted for a single vehicle.

Referring now to the drawing, the fluid pressure portion of the vehicle brake equipment is represented by the brake cylinder 10 to which fluid under pressure may be supplied through pipe 11 when effecting an application of the fluid pressure brakes.

The magnetic brake portion of the equipment is represented by magnetic brake devices 12, each of which has associated therewith a raising cylinder 13, and magnet valve devices 14 for controlling the supply of fluid under pressure to and its release from these raising cylinders.

For effecting an application of the track brake in response to fluid under pressure supplied to the brake cylinder 10, and for maintaining the track brake applied for a predetermined interval of time, there are provided pneumatic switch devices 15 and 16, a timing magnet valve device 17 and a timing reservoir 18.

Considering now these devices more in detail, the magnetic brake devices 12 may be of any of the conventional types employed, and each is preferably provided with a yoke member 20 secured thereto and to a piston rod 21 of a piston 22 disposed in a raising cylinder 13. Each raising cylinder 13 is preferably secured to some part of the truck frame by means of a bracket 23, so that when fluid under pressure is supplied to the raising cylinder 13 the piston 22 will be actuated upwardly and thus hold the track brake device suspended above the rail. When fluid under pressure is released from the raising cylinder 13, the track brake device 12 will drop by force of gravity to engagement with the rail.

The magnet valve device 14, which controls the supply of fluid under pressure to and its release from the raising cylinder 13, is embodied in a casing provided with a supply valve 24 and a release valve 25. A spring 26 urges the release valve 25 toward seated position and the supply valve 24 toward unseated position. An electromagnet (not shown) in the upper part of the valve device casing functions when energized to actuate the supply valve 24 toward seated position and the release valve 25 toward unseated position.

When the electromagnet is deenergized and the two valves 24 and 25 are in the positions shown in the drawing, a communication is established between a supply reservoir 27 and each of the raising cylinders 13, so that fluid under pressure may flow from the supply reservoir to the raising cylinders and thus hold the track brake devices 12 suspended above the rails. When the electromagnet is energized and the two valves are actuated downwardly, this communication is cut off and each of the raising cylinders 13 is vented to the atmosphere past the unseated release valve and by way of an exhaust port 26. The track devices are thus permitted to drop to engagement with the rail.

The two pneumatic switch devices 15 and 16 are essentially duplicates of each other. Each is embodied in a casing having a chamber 30 in which is disposed a piston 31. The piston 31 is provided with a stem 32, and secured to the upper end of the stem is an insulating member 33 which carries a bridging contact 34 adapted to bridge and connect together two stationary contacts 35.

A spring 36 urges the piston 31 downwardly, where in its downmost position an annular rib 37 seals against a gasket 38. When the piston 31 is in its downmost position the bridging contact 34 is out of engagement with the stationary contacts 35, as shown in the drawing.

When however fluid under pressure is supplied to the piston chamber 30 the area of the piston within the rib 37 only is initially exposed to the pressure of the fluid, and when this pressure has risen to a value such that the force on the piston breaks the seal between the rib 37 and gasket 38 the full face of the piston will be exposed and the piston will thus be actuated upwardly very quickly, thereby bringing bridging contact 34 into engagement with stationary contacts 35.

When fluid under pressure is released from the piston chamber 30, or diminished below a predetermined degree, the spring 36 will actuate the piston 31 downwardly and thus break the connection between the two contacts 35.

The timing magnet valve device 17 is similar to the aforedescribed magnet valve device 14, and is embodied in a casing provided with a supply valve 40 and an application valve 41. A spring 42 urges the valve 41 toward seated position and the valve 40 toward unseated position. An electromagnet (not shown) in the upper part of the valve device casing functions when energized to actuate the valve 40 toward seated position and the valve 41 toward unseated position.

When the two valves 40 and 41 are positioned as shown, that is when the electromagnet is deenergized, a communication is established between the supply reservoir 27 and the timing reservoir 18, so that the timing reservoir will be charged to supply reservoir pressure. When the valve 40 is seated and the valve 41 is unseated, the communication between the supply and timing reservoirs is cut off, and a new communication is established between the timing reservoir and the switch device 15, which communication includes a pipe 43.

Connected between the pipe 43 and the atmosphere is a restriction in the form of a choke 44. When the timing reservoir 18 is thus connected to the piston chamber 30 in the switch device 15, fluid under pressure will flow from the timing reservoir to the chamber 30 and to the atmosphere by way of the choke 44. The pressure of the fluid supplied to the chamber 30 will be sufficient to actuate piston 31 upwardly so that bridging contact 34 bridges stationary contacts 35. But as will be more fully described later, after a predetermined interval of time, the pressure in chamber 30 will diminish to a value such that spring 36 will return piston 31 to its lowermost position. The switch device 15 thus maintains its contacts closed for a predetermined or chosen interval of time only.

The operation of this embodiment of my invention is as follows:

When it is desired to effect an application of the brakes, fluid under pressure is supplied to the pipe 11 to a degree according to the desired degree of application of the brakes. As the brake cylinder 10 is connected directly to the pipe 11, the fluid pressure brake will be applied to a degree corresponding to the degree of pressure in pipe 11.

Fluid under pressure supplied to pipe 11 flows also to the piston chamber 30 in the switch device 16. As before described, when this pressure has reached a predetermined value, the piston 31 in the switch device 16 will be actuated upwardly and its bridging contact 34 will bridge and connect together its stationary contacts 35. When this takes place, the timing magnet valve device 17 will be energized from a source of current supply on the vehicle, such for example as a battery 45, through a circuit which includes beginning at the battery, conductor 46, contacts 34 and 35 of switch device 16, conductors 47 and 48, magnet valve device 17, and conductors 49, 50 and 51, which lead back to the battery 45.

Energization of the magnet valve device 17 will cause seating of valve 40 and unseating of valve 41, whereupon the timing reservoir 18 will be connected to the piston chamber 30 of the switch device 15 and to the atmosphere. This switch device will then actuate its bridging contact 34 upwardly to bridge its stationary contacts 35. As will be observed from the drawing, a circuit will be established from the battery 45 to a relay 52, which circuit includes conductor 46, the contacts of switch device 16, conductors 47 and 53, the contacts of switch device 15, conductor 54, the relay 52, and conductors 55, 50 and 51 leading back to the battery 45.

Relay 52 will thus be energized and will close its contacts 56. Closing of these contacts establishes a circuit from the battery 45 to each of the track brake devices 12 and to the magnet valve device 14, as will be apparent from the arrangement shown. The magnet valve device 14 will thus be energized to effect seating of its supply valve 24 and unseating of its release valve 25. Fluid under pressure will then be released from each of the raising cylinders 13, and the track brake devices 12 permitted to drop to engagement with the rail. When each track brake device has been energized, a braking effect will be produced on the track, and this braking effect will be concurrent with that produced by the brake cylinder 10.

Current flowing to the track brake devices 12 flows through a resistance device 57 which functions to limit the degree of current supplied thereto.

Now since fluid supplied from the timing reservoir 18 to the piston chamber 30 of switch device 15 flows to the atmosphere through the choke 44, it will be obvious that after a predetermined interval of time the pressure in piston chamber 30 will drop to a value such that spring 36 will return piston 31 to its lowermost position, whereupon contact 34 will disengage from contacts 35. When this takes place, the relay 52 will be deenergized and thus open its contacts 56. Opening of these contacts will of course deenergize both the brake devices 12 and the magnet valve device 14. Fluid under pressure will then again be supplied to the raising cylinders 13 and the track brake devices will be lifted from the rails.

The interval of time during which the track brake devices are energized and applied to the rails is chosen as an interval of sufficient duration to insure effective operation of the track brakes, and yet of insufficient duration to produce dangerous heating of the track brake devices.

If after the track brakes have been applied it is desired to release them before they would have been released due to functioning of the timing means described, fluid under pressure may be released from the pipe 11, thus causing opening of the contacts in switch device 16. The operator therefore may intermittently apply and release the track brake coincidentally with intermittently applying and releasing the fluid pressure brake.

While I have illustrated my invention by means of one embodiment thereof, it is not my intention to be limited to the exact details of this embodiment, nor otherwise than by the spirit and scope of the appended claims.

Having now described my invention, what I claim as new and desire to secure by Letters Patent, is:

1. In a vehicle brake system, in combination, fluid pressure brake means, electrical brake means, fluid pressure operated switch means adapted to be operated by fluid under pressure supplied to effect an application of said fluid pressure brake means, means operated upon an increase in pressure for effecting an application of said electrical brake means and operated upon a subsequent decrease in pressure for effecting a release of said electrical brake means, and means operated in response to operation of said fluid pressure operated switch means for effecting a supply of fluid under pressure to said last mentioned means and for thereafter permitting said pressure to diminish below a predetermined degree in a chosen length of time.

2. In a vehicle brake system, in combination, a brake cylinder, a track brake, a first switch device adapted to be operated to a closed position in response to pressure of fluid supplied to said brake cylinder, a second switch device adapted to be operated by the supply of fluid under pressure thereto to effect an application of said track brake, means operated in response to operation of said first switch device to said closed position for effecting a supply of fluid under pressure to said second switch device, and means whereby the pressure of fluid supplied to said second switch device is diminished in a predetermined length of time to a value where said second switch device effects a release of said track brake.

3. In a vehicle brake system, in combination, a track brake device, a first set of normally open contacts, means rendered effective upon the closing of said first set of contacts for effecting an application of said track brake device, a second set of normally open contacts, fluid pressure operated means for closing said second set of contacts, and means responsive to closing of said second set of contacts for effecting closing of said first set of contacts for a predetermined interval of time.

4. In a vehicle brake system, in combination, a magnetic track brake device, a fluid pressure operated switch device having normally open contacts for controlling a circuit through which current is supplied to effect energization of said track brake device, a normally charged reservoir, an electroresponsive valve device operable when energized to connect said reservoir to said switch device to cause closing of said contacts, and means providing a restricted communication between said switch device and the atmosphere, whereby the pressure of fluid supplied to said switch device from said reservoir is slowly diminished to a value insufficient to maintain the contacts of said switch device closed.

5. In a vehicle brake system, in combination, a brake cylinder, a magnetic track brake device, a battery, a relay controlling a power circuit leading from said battery to said track brake device, a normally open relay circuit for energizing said relay from said battery, a switch device having normally open contacts in said relay circuit and operable by brake cylinder pressure to close said contacts, and timing means controlled by said contacts and rendered effective only upon closing of said contacts for subsequently opening said relay circuit after a predetermined interval of time.

ELLIS E. HEWITT.